Patented Mar. 31, 1953

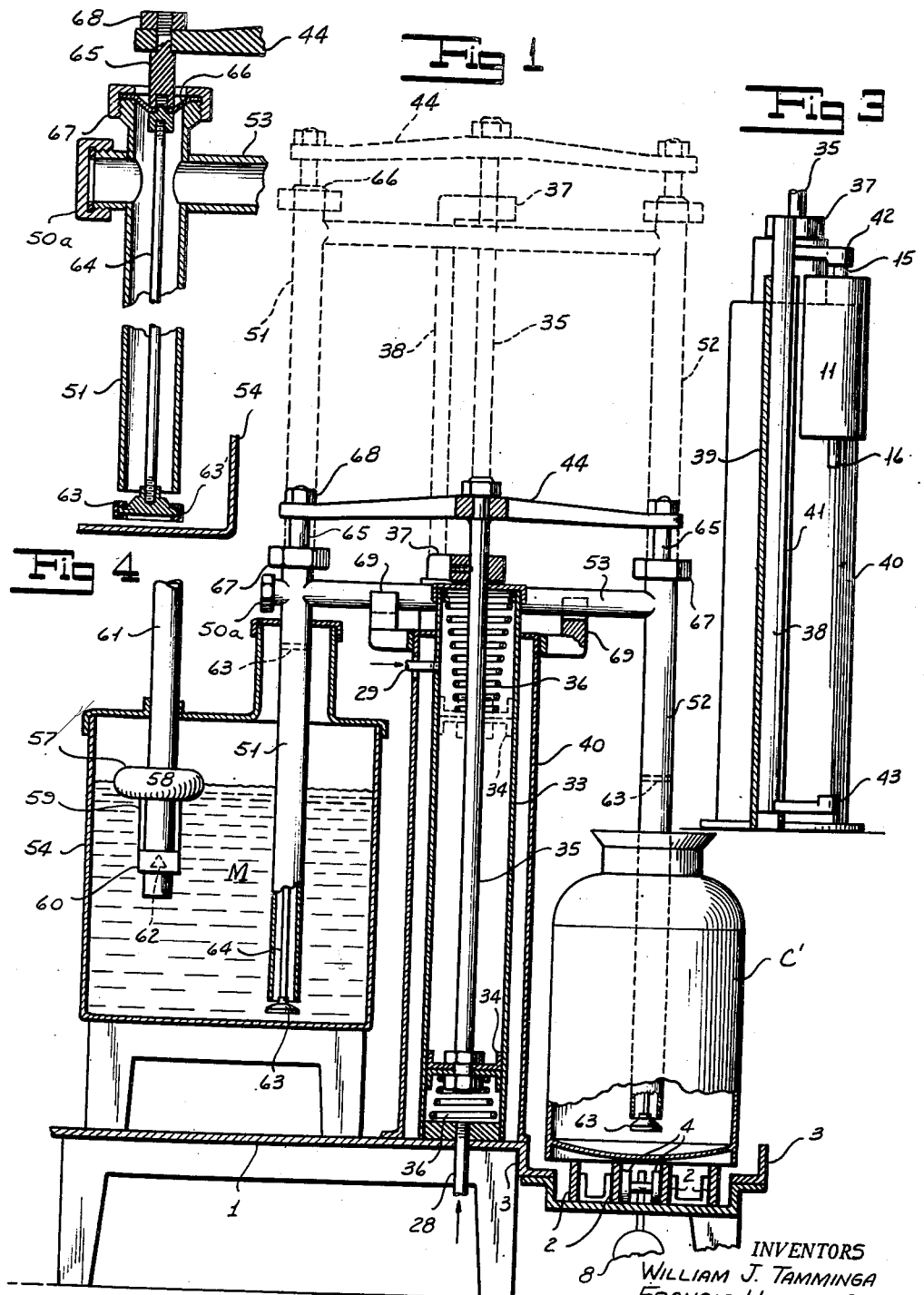

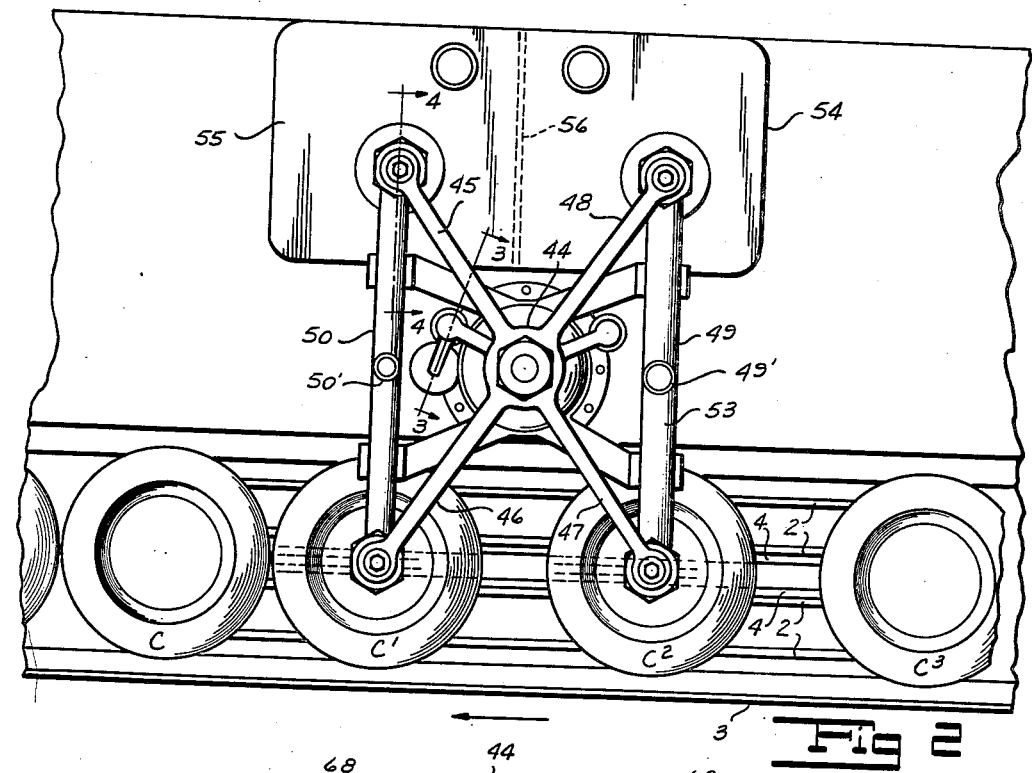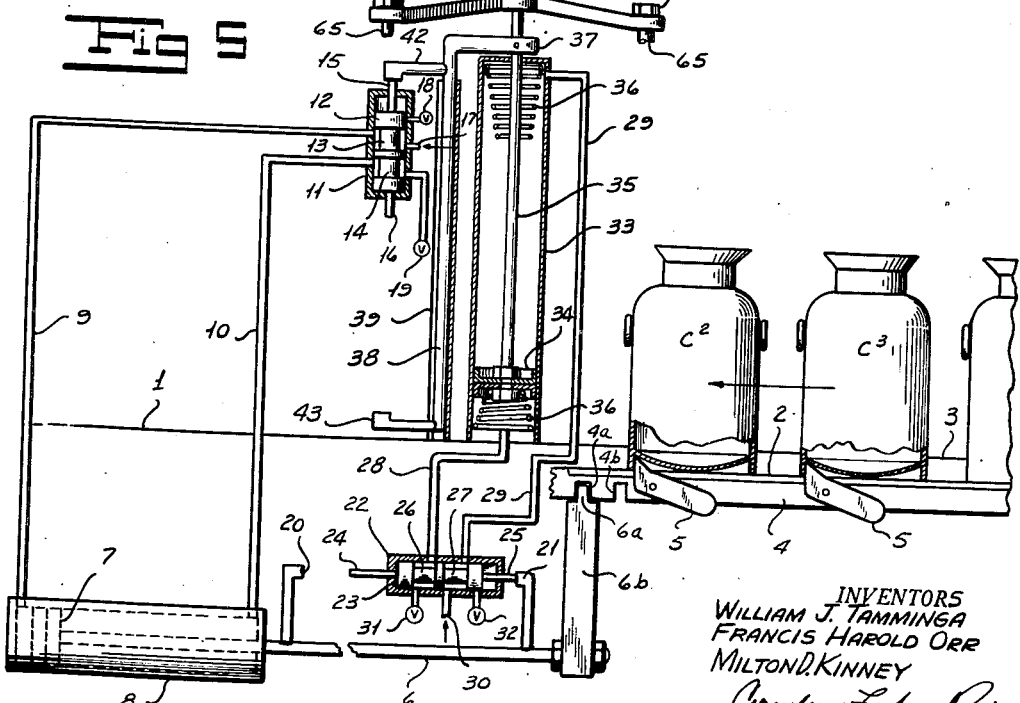

2,633,282

UNITED STATES PATENT OFFICE 2,633,282

AUTOMATIC CAN FILLING MACHINE HAVING SIPHONS FOR DISPENSING A PREDETERMINED AMOUNT OF FLUID

William J. Tamminga and Milton D. Kinney, Goshen, and Francis Harold Orr, East Meredith, N. Y.; said Tamminga assignor to said Kinney and said Orr Application April 1, 1949, Serial No. 84,998

16 Claims. (Cl. 226—26)

This invention is a can filling machine particularly adapted for use at creameries and other milk depots, where milk delivery cans, usually of the twenty or forty quart variety, are filled from a bulk supply.

Under present day practice the handling of cans for filling has required very considerable floor space and much handling of the cans. They are delivered from the washing apparatus and manually stacked. From this stack they are taken individually to a filling platform where they are manually filled and after filling they are manually removed. The filling is relatively slow when thus performed and consequently the cans accumulate in advance of the filling platform and frequently have to be moved from room to room while waiting filling. This practice requires laborious and time consuming work of many hands and much floor space. The object of this invention is to eliminate manual labor and labor costs, economize in floor space and to fill the cans in a uniform, efficient and thoroughly automatic way.

In accordance with this invention, the cans are preferably delivered from the conventional washer, through a cooling chest, directly to the machine of this invention where they are engaged by an automatic feeder and delivered thereby to a filling station. There they are automatically filled and thereafter delivered from the machine. During their passage through the machine the cans are caused to travel by a step by step movement along a predetermined path, past a source of bulk milk supply which is kept at a uniform level by a suitable means, such as a float valve or weir and, as the cans come to rest at the filling station, a siphon fully charged with milk from the milk supply is lowered into a can and valves associated with the legs of the siphon are automatically opened so that the milk flows from the source of supply into the can. After milk has been fed from the source of supply into the can in a sufficient amount to fill the can, the siphon is withdrawn from the can and the can moves along a step so that the next can is brought into filling position, but as the siphon is withdrawn from the can, the legs of the siphon are sealed so as to maintain the liquid column and leave the siphon in condition to repeat the operations stated on the next can which reaches the filling station. If desired, a single siphon, operable upon a single can at a time may be used, but we prefer to utilize a plurality of siphons, preferably two, which deliver milk to two successive cans at the same time. One of these siphons delivers the greater portion of the milk into the can and the other siphon meters the final charge to complete the filling of the can. To facilitate this operation the metering siphon is preferably of smaller cross section so as to effect a more accurate filling operation. In carrying out this invention, the means for moving the cans to the filling station and the raising and lowering of the siphons into the cans are interlocked to operate in timed relation so that the machine may operate automatically for the purposes stated.

An important feature of this invention consists in novel and efficient means for sealing each siphon during periods when it is withdrawn from the can and for unsealing it when it is in can filling position.

Another feature consists in operating a plurality of siphons in a plurality of cans at the same time and feeding the respective siphons from independent sources of milk supply to obtain the metering operation to which we have referred.

A further feature of the invention resides in the interlocking means whereby the several operations of the machine are automatically timed.

Features of the invention, other than those adverted to, will be apparent from the hereinafter detailed description and appended claims, when read in conjunction with the accompanying drawings.

The accompanying drawings illustrate one practical embodiment of the invention, but the construction therein shown is to be understood as illustrative, only, and not as defining the limits of the invention.

Fig. 1 is a vertical section through the machine of this invention with certain parts shown in elevation or broken away in the interest of clearness.

Fig. 2 is a plan view of the machine of Fig. 1.

Fig. 3 is a fragmental section taken substantially in the plane of the line 3—3 of Fig. 2, but illustrating certain parts in elevation.

Fig. 4 is a fragmental section taken in the plane of the line 4—4 of Fig. 2.

Fig. 5 is a schematic view showing the several parts of the machine interlocked for automatic operation.

In the drawings, 1 indicates a table, at the forward edge of which are arranged a series of track bars 2 along which cans, C, C', C² and C³ are adapted to rectilinearly travel. Guard rails 3 extend along the lateral edges of the tracks so that the cans cannot be laterally displaced therefrom. Arranged beneath the cans is a feeder 4 mounted for rectilinear movement and carrying a series of pivoted weighted pawls 5, spaced longitudinally of the feeder a distance substantially equal to the distance between centers of the long legs of the filler siphons 49 and 50, hereinafter more fully described.

The pawls 5 are adapted to engage with the inner surfaces of the bottom flanges of the successive cans, as shown in Fig. 5, so as to feed them step by step along the tracks 2 as the feeder 4 is reciprocated. In the forward end of the feeder 4 are two slots 4a and 4b, the former of which is appropriate to the feed of forty-quart cans and the latter of which is appropriate to the feed of twenty-quart cans. With these slots is adapted to be selectively engaged a driving projection 6a on the upper end of a bracket 6b, secured to an operating rod 6, connected to the piston 7 of a pneumatic power cylinder 8. As the piston is reciprocated in the cylinder, the feeder is correspondingly reciprocated to feed the cans in succession to the feeding stations indicated by the cans C' and C² of Fig. 2. The pawls 5 of the feeder are shown as engaged with the inner rims of the can bottoms in Fig. 5, a single pawl being shown in cooperation with each can in this figure. If desired, however, twin pawls may be provided to engage the outsides of the cans at their rear ends, this latter structure being desirable in the event that so-called "steamship" cans are to be filled, for these latter cans are not provided with recessed bottoms as are the usual milk delivery cans of commerce. When twin pawls are used they are placed side by side and serve to push the cans ahead of them rather than draw the cans along, as shown in Fig. 5.

The opposite ends of the cylinder 8 are connected by pipes 9 and 10 to the interior of the casing of a control valve 11. Within this casing is a slide valve piston 12 having annular passages 13 and 14 and from the opposite ends of the piston project stems 15 and 16 which, when operated upon, will shift the valve piston 12 to control the feed of pneumatic pressure from an inlet 17 to either of the pipes 9 or 10 or the venting of these pipes through valved outlets 18 or 19, depending upon the position of the slide valve piston 12.

Mounted on the operating rod 6 are a pair of spaced apart operating arms 20 and 21 and between these arms is a control valve 22 having a casing in which is mounted a slide valve piston 23, having stems 24 and 25 projecting from its opposite ends and adapted to be engaged by the arms 20 and 21 at the termini of movement of the operating rod 6 in opposite directions. The slide valve piston 23 has annular channels 26 and 27 adapted to connect pipes 28 and 29 alternately to the source of pneumatic pressure 30 and valved pressure outlets 31 and 32. The pipes 28 and 29 lead to the opposite ends of an upright cylinder 33 and in this cylinder a work piston 34 is mounted for reciprocation. It has a stem 35 which extends axially of the cylinder and projects above the top end thereof through a suitable stuffing box. Springs 36 or dash pots may be provided at the opposite ends of the cylinder to cushion the piston at the termini of its travel.

Attached to the piston stem 35 is an offset bracket 37 carrying a vertical rod 38 mounted in an upright guide tube 39 fixed to the exterior of a tubular column 40 surrounding the cylinder 33 and rigid with the table 1, as shown in Fig. 1. This tube has a vertical slot 41 in one side and through this slot project operating arms 42 and 43 fixed to the rod 38 near its top and bottom and extending laterally through the slot 41 to engage with the opposite ends of the stems 15 and 16 of the control valve 11, as the work piston 34 approaches the respective termini of its vertical travel.

Rigidly secured to the upper end of the piston stem 35 is a yoke 44 in the form of a four arm spider, shown best in Fig. 2. The four arms of this spider are designated 45, 46, 47 and 48. This spider is adapted to support two siphons 49 and 50. The siphon 49 has parallel upright legs 51 and 52 connected at their upper ends to a transverse bridge 53. The leg 51 is adapted to project downwardly into a tank 54 containing a supply of milk M, while the leg 52 is arranged substantially coaxial of the can C², when the latter is in the filling station shown in Fig. 2. The siphon 49 is supported by the outboard ends of the spider arms 47 and 48. The spider arms 45 and 46 support the siphon 50 in the same manner. The siphon 50 is adapted to feed milk from a tank 55 to a can at the filling station indicated at C' in Fig. 2. By preference the cross section of the liquid column of the siphon 50 is smaller than that of the siphon 49. Each siphon has a clean out opening 50a which, when opened, permits a brush to be introduced into the cross leg of the siphon for cleaning purposes.

The tanks 54 and 55 may be in the form of a single tank provided with a partition 56 between two distinct pools of milk, so that the siphons feed from independent pools and the level in each pool is preferably controlled by a float valve 57. This may be of any appropriate form, but preferably comprises a float 58 connected by a pair of spacers 59 to a sleeve 60. This sleeve closely embraces the infeed pipes 61 which has therein a triangular opening 62. When the level in the tank is as desired, the sleeve 60 covers and seals the opening 62, but, as the level recedes, the sleeve likewise recedes to uncover the feed opening 62 and allow milk to flow into the tank until the level is restored. It will of course be understood that the outlet leg of each of the siphons is longer than the inlet leg so as to render the siphons operative. The siphons may be charged through filler openings 49' and 50' which are normally sealed.

It is essential in the operation of this machine that, after the siphons have been charged with liquid so as to completely fill them, this condition must be maintained so that the siphons do not become air locked. To this end, means is provided for sealing both legs of each siphon during the non-filling period and unsealing them during the filling period. To this end, a valve 63 with a rubber seat 63' is associated with the lower end of each siphon leg and to this valve is secured a rod 64 which extends upwardly through such leg, as shown best in Fig. 4, and is connected at its upper end by a fitting 65 to an elastic diaphragm 66, preferably of rubber. This rubber is clamped across the upper end of the siphon leg by a screw cap 67 which forms a hermetic seal through which air cannot enter. The upper end of the fitting 65 is connected to the corresponding arm of the yoke 44 by a nut 68, as shown best in Fig. 4.

When the work piston 34 is elevated to lift the siphons, the weight of these siphons will be imposed on the rubber diaphragms 66 which will thereby be bulged upwardly to cause the lower ends of the siphon legs to engage with the valves 63 rigidly secured to the fittings by the rods 64, with the result that the weight of the siphons will be borne by the valves 63. This will insure a tight seal of the lower end of each leg of each siphon when the siphons are lifted as stated. When the siphons are lowered, the valves 63 will remain closed until the piston 34 nears its lowermost position, whereupon the cross arms 53 of the siphons will engage with stops 69 fixed on the column 40, so that further movement of the piston 34 in a downward direction will leave the siphons in their lowermost positions, while the valves 63 are further lowered to unseal the lower ends of the siphon legs and permit liquid to flow through the siphons.

*Operation*

The tanks 54 and 55 are filled with milk to the float valve regulated level. The cans to be filled are placed on the tracks 2 and the inlet 30 of the control valve 22 and the inlet 17 of the control valve 11 are connected to an appropriate source of pneumatic pressure. Both siphons are charged with milk introduced through the openings 49' and 50' which are thereafter sealed and the parts are brought to the position wherein the siphons are elevated as shown in dotted lines in Fig. 1. The cans C' and C² are placed at the filling stations ready for cooperation with the two siphons. Air is admitted through the inlet 30 and is passed by the valve 22 to and through the pipe 29 into the upper end of the upright cylinder 33, with the result that the work piston 34 is caused to descend and thus simultaneously lower the longer legs of both siphons into the two cans C' and C².

As the siphons approach fully lowered positions, they engage with the stops 69 which arrest their movement, while continued downward movement of the piston 34 will open the valves 63 so that milk will flow from the tanks 54 and 55 through the respective siphons 49 and 50 into the cans C² and C'. Meanwhile the slide valve 12 is in the position of Fig. 5, admitting compressed air from the inlet 17 through the pipe 9 into the rear end of the cylinder back of the piston 7, while the opposite end of the cylinder is vented through the valved outlet 19, so that, after the piston 34 has descended, the piston 7 is moving to the right in Fig. 5 to retract the feeder 4. The valve 19 is so adjusted as to control the speed of this retrograde movement of the piston 7, so that the operating arm 20 will not engage with and shift the slide valve 22 until the desired amount of milk has been fed into both of the cans C² and C'. Thus the timing of the apparatus may be in part controlled by the valve 19.

When the operating arm 20 engages with the stem 24 of the valve 22, slight continued movement of the piston 7 to the right will shift the valve 22 to feed pneumatic pressure from the inlet 30 through the pipe 28 to the lower end of the work cylinder 33 while the upper end of said cylinder is vented to the pipe 29 and valved outlet 32. The work piston 34 then begins to rise, first closing the valves 63 and immediately thereafter lifting the two siphons out of the cans C² and C'. The first can C' is not completely full so that it is necessary to remove it from the tracks and either fill it manually or dump its contents back into one of the tanks. This leaves the can C² in its partially filled condition and the empty can C³ immediately behind it. By the time the work piston 34 reaches the upper end of the travel, the operating arm 43, carried by the offset bracket 37, engages with the depending stem 16 of the valve 12 and lifts the slide valve therein. Pressure admitted through inlet 17 is thus communicated to the right hand end of the cylinder 8 and the piston 7 moved to the left to move the can C² into the filling station corresponding to the siphon 50, while the can C³ is moved into cooperative relation with the filling station of the siphon 49. The rapidity of this movement may be controlled by adjustment of the valved outlet 18 and, in practice, it may be fairly rapid. In the meantime pressure is admitted through the inlet 30 of the lower valve through the pipe 29 to the upper end of the work cylinder 33, so that when the cans C² and C³ are in position for filling, the two siphons will be lowered into these cans and the filling of these cans will proceed as hereinbefore described.

In practice, it is preferred that the siphon 49 be of greater diameter than the siphon 50, so that the greater portion of milk delivered to the cans will be by the largest siphon which partially fills the cans in succession, the remaining filling to be accomplished by the smaller siphon when the cans are moved along the next step. This makes it possible to get a better metering of the amount of milk fed to each can. The actual milk level fed by each siphon operation may be controlled by the vent valves 18, 19, 31 and 32 of the respective slide valves 12 and 22, although, if desired, the liquid levels in the two tanks 54 and 55 may be controlled by their float valves so as to actually control the degree of filling through each siphon. In other words, the level maintained in the tank 54 of the siphon 49 may be regulated so that the siphon will feed until the level in the corresponding can will be the same as the level in the tank, while the level in the tank 55 may be regulated to be the same as the level of the liquid in the can when the latter is fully filled. Either method of control may be used.

It should be understood that so long as the outlet legs of the siphons are in the cans, they will displace a certain amount of liquid therein, so that the can should actually be filled to nearly the top of the lip of the can when the siphon 50 ceases to operate. However, when the siphons are lifted out of the can, the milk level therein will drop to that appropriate to a can filled to its standard capacity. To fill forty-quart cans, the projection 6a of the bracket 6b should be engaged with the slot 4a of the feeder 4 while the same projection should be engaged with the slot 6b of the feeder to fill twenty-quart cans. This change may be easily and quickly made.

When this machine is engaged in filling cans in succession in the manner described, the only manual attention required is to remove the covers from the empty cans and place them on the filled cans. One man can readily attend to these operations, for the feeder will automatically advance the cans in succession to the filling stations and after they leave the filling stations, the feed of succeeding cans will push the filled cans along the delivery end of the track to the take-off platform. The machine operates entirely automatically with all parts operating in timed relation to advance empty cans to the filling station, to there fill the cans with a uniform quantity of milk and to thereafter deliver the cans to the point of take off.

The machine may handle cans of any size having a top opening which is large enough to receive the long legs of the siphons. It is convenient to build this machine to fill forty-quart cans. The twenty-quart or smaller cans may be handled by machine with equal facility, and with appropriate regulation of filling time, either by control of the vent valves or by control of liquid level in the feed tanks.

Experience has shown that the operation of filling cans in the manner described has many advantages over hand filling. The uniform level in the cans is assured and the filling is accomplished without foaming of the milk and without spilling the milk over the outside of the can. The machine is entirely automatic in its operations and unfailing in the performance thereof. The structure is relatively simple and requires little maintenance. Moreover, all parts of the apparatus which come in contact with the milk can be readily dismantled for thorough cleaning and sterilizing.

The foregoing detailed description sets forth the invention in its preferred practical form, but the invention is to be understood as fully commensurate with the appended claims.

Having thus fully described the invention, what we claim as new and desire to secure by Letters Patent is:

1. A can filling machine comprising: a tank to contain a pool of milk, a siphon guided for vertical movement with its short leg immersed in said pool and its long leg projecting into the can whereby milk may flow from the tank into the can, a valve at the lower end of each leg and open during the flow of milk to the can, and means for lifting the siphon bodily to withdraw it from the can, said lifting means being connected to the valves of the siphon whereby the weight of the siphon is imposed upon the valves when the siphon is lifted and the valves thereby seated before withdrawing the siphon from the can.

2. A can filling machine comprising: a tank to contain a pool of milk, a siphon guided for vertical movement with its short leg immersed in said pool and its long leg projecting into the can whereby milk may flow from the tank into the can, a valve at the lower end of each leg and open during the flow of milk to the can, a valve stem secured to each valve and extending upwardly to substantially the top of each leg of the siphon and there attached to an elastic diaphragm having an impervious seal with the siphon and positioned within the siphon above the path of milk flowing through the siphon, and siphon lifting means connected to the diaphragm for lifting the siphon to withdraw it from the can and simultaneously seating said valves to seal the siphon.

3. A can filling machine comprising: a tank to contain a pool of milk, a siphon guided for vertical movement with its short leg immersed in the pool and its long leg projecting into the can whereby milk may flow from the tank into the can, a pneumatically operable piston connected to the siphon for withdrawing it from the can when the milk level in the can reaches a predetermined level, means for sealing the siphon prior to withdrawing the siphon from the can, a pressure control valve for controlling the feed of pneumatic pressure to one side of the piston to elevate the same, and means for venting the other side of the piston during the elevation of the piston, said last mentioned means including a valve for controlling the venting operation and thus controlling the speed of the piston.

4. A can filling machine comprising: a tank to contain a pool of milk, a siphon the short leg of which is adapted to be immersed in said pool while the long leg of which is adapted to project into the can, an upright pressure cylinder having therein a piston connected to the siphon, a pneumatic pressure inlet at the bottom of the cylinder to elevate the piston and thus withdraw the siphon from the can, a pneumatic pressure inlet at the top of the cylinder for depressing the piston to introduce its long leg into another can, and a valve at the lower end of each leg of the siphon, said valves having valve stems connected to the piston and the weight of the siphon being borne by the valves during elevation of the siphon.

5. A can filling machine comprising: a tank to contain a pool of milk, a siphon the short leg of which is adapted to be immersed in said pool while the long leg of which is adapted to project into the can, an upright pressure cylinder having therein a piston connected to the siphon, a pneumatic pressure inlet at the bottom of the cylinder to elevate the piston and thus withdraw the siphon from the can, a pneumatic pressure inlet at the top of the cylinder for depressing the piston to introduce its long leg into another can, a valve at the lower end of each leg of the siphon, said valves having valve stems connected to the piston and the weight of the siphon being borne by the valves during elevation of the siphon, and a stop for arresting the downward movement of the siphon before the piston has reached the lower terminus of its travel to insure opening of the valves and flow of milk through the siphon into the can.

6. A can filling machine comprising: a tank to contain a pool of milk, a feeder for feeding cans in succession to a filling station in proximity to the tank, a pneumatic cylinder having therein a piston connected to the feeder for intermittently operating the feeder to feed the cans, a siphon the short leg of which is adapted to extend into the pool and the long leg of which is adapted to extend into a can at the filling station, a work cylinder having therein a piston connected to the siphon for introducing its long leg into the can and withdrawing such leg from the can, valves for sealing the siphon when withdrawn from the can, and pneumatic pressure control valves for controlling the feed of pressure to the opposite sides of both the feed piston and the work piston, the control valve for the work piston being in turn controlled by movements of the feed piston and the control valve of the feed piston being in turn controlled by the movements of the work piston.

7. A can filling machine comprising: a plurality of siphons the short leg of each of which is immersed in a pool of milk and the long leg of each of which projects into a different can, a valve at the lower end of each leg of each siphon having a valve stem projecting upwardly through the corresponding leg to a point above the top of the siphon and passing through the top of the siphon with an impervious seal, a yoke secured to all of the valve stems, and means for raising and lowering the yoke to close the valves and raise the siphons collectively out of the cans when the yoke is raised and to lower the siphons and open the valves when the yoke is lowered.

8. A can filling machine comprising: a plurality of siphons the short leg of each of which is immersed in a pool of milk and the long leg of each of which projects into a different can, a valve at the lower end of each leg of each siphon having a valve stem projecting upwardly through the corresponding leg to a point above the top of the siphon and passing through the top of the siphon with an impervious seal, a yoke secured to all of the valve stems, and a pneumatically operable piston connected to the yoke.

9. A can filling machine comprising: a plurality of siphons the short leg of each of which is immersed in a pool of milk and the long leg of each of which projects into a different can, a valve at the lower end of each leg of each siphon having a valve stem projecting upwardly through the corresponding leg to a point above the top of the siphon and passing through the top of the siphon with an impervious seal, a yoke secured to all of the valve stems, a pneumatically operable piston connected to the yoke, a pneumatic feeder for moving cans successively into filling positions, and means for interlocking said piston and feeder for timed operation.

10. A can filling machine comprising: a feeder for feeding pairs of cans in succession to spaced filling stations, a pneumatic cylinder having therein a feed piston connected to the feeder to intermittently operate the same, a siphon associated with each filling station with the short leg of the siphon extending into a pool of milk and the long leg extending into the can at the filling station, a work cylinder having a piston connected to both of the siphons for raising their long leg out of and lowering them into the cans at the filling stations, valves for sealing the siphons when withdrawn from the cans, and pneumatic pressure control valves for controlling the feed of pneumatic pressure to the opposite sides of both the feed piston and the work piston, the control valve of the work piston being in turn controlled by movements of the feed piston and the control valve of the feed piston being in turn controlled by the movements of the work piston.

11. A can filling machine comprising: a plurality of siphons the short leg of each of which is immersed in a pool of milk and the long leg of each of which projects into a different can at a different filling station, means for feeding cans in pairs to said filling stations in succession, means for raising and lowering the siphons into and out of cooperation with said cans and for timing the filling operations so that each can is partially filled by one siphon and thereafter the filling completed by the other siphon, the last mentioned siphon being of smaller diameter to more accurately meter the filling operation.

12. A can filling machine comprising: a tank with at least one pool of milk, a plurality of siphons mounted at successive stationary filling stations and there guided for up and down movement with the short leg of each siphon immersed in the pool of milk and the long leg of each siphon adapted to project into a different can positioned at the corresponding filling station whereby milk may flow contemporaneously from the tank into the several cans, means for elevating the several siphons to withdraw their long legs from the several cans when predetermined milk levels in the cans are reached, means for sealing all of the siphons before withdrawing them from the cans, and means for feeding cans successively to and from the several stationary filling stations in succession while the several siphons are in elevated positions, whereby successive predetermined quantities of milk are fed to each can by the several siphons in succession.

13. A can filling machine according to claim 12, wherein the several siphons are of different capacity.

14. A can filling machine according to claim 12, wherein the siphons at the successive stations in the direction of the feed of the cans are of progressively less delivery capacity.

15. A can filling machine according to claim 12, wherein all of the siphons are connected together whereby they are all simultaneously raised and lowered while the corresponding cans are at rest at the corresponding filling stations.

16. A can filling machine comprising: a plurality of successive filling stations arranged consecutively along a can path, a siphon at each filling station with a tank containing a pool of milk into which the short arm of the siphon dips while the long arm of the siphon extends into a can at that particular station, said filling stations being stationary, means for moving cans along the can path to bring the cans consecutively at the filling stations in succession with a period of dwell at each station, whereby milk is fed into the can at each station, means for lowering each siphon to lower its long arm into a can while the can is at rest at the corresponding station, and means to seal each of the siphons while it is in raised position and unseal it while it is in lowered position.

WILLIAM J. TAMMINGA.
MILTON D. KINNEY.
FRANCIS HAROLD ORR.

REFERENCES CITED

The following references are of record in the file of this patent:

UNITED STATES PATENTS

| Number | Name | Date |
|---|---|---|
| 1,166,520 | Henes | Jan. 4, 1916 |
| 1,290,358 | Roberts | Jan. 7, 1919 |
| 1,547,823 | Risser | July 28, 1925 |
| 2,352,863 | Robinson | July 4, 1944 |